Oct. 9, 1934.   J. F. HIGBEE   1,976,068
FLOATING WHEEL HUB MOUNTING
Filed Nov. 5, 1930   3 Sheets-Sheet 1

INVENTOR.
James F. Higbee
BY Parker J Burton
ATTORNEYS

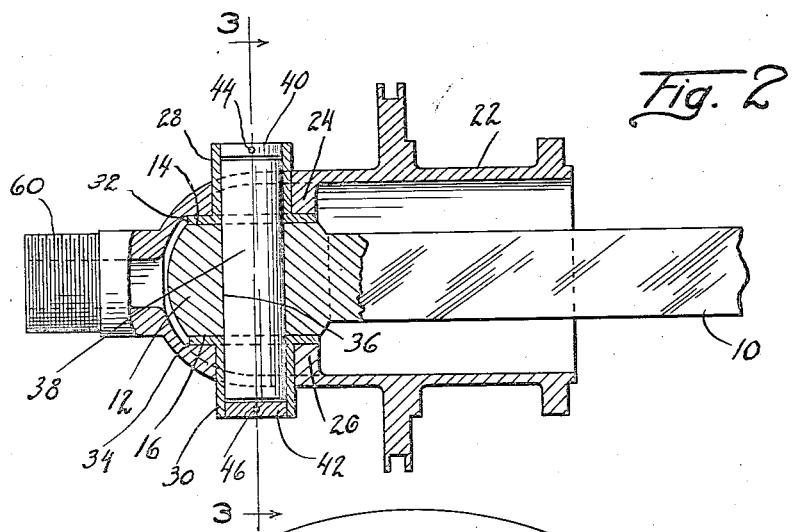
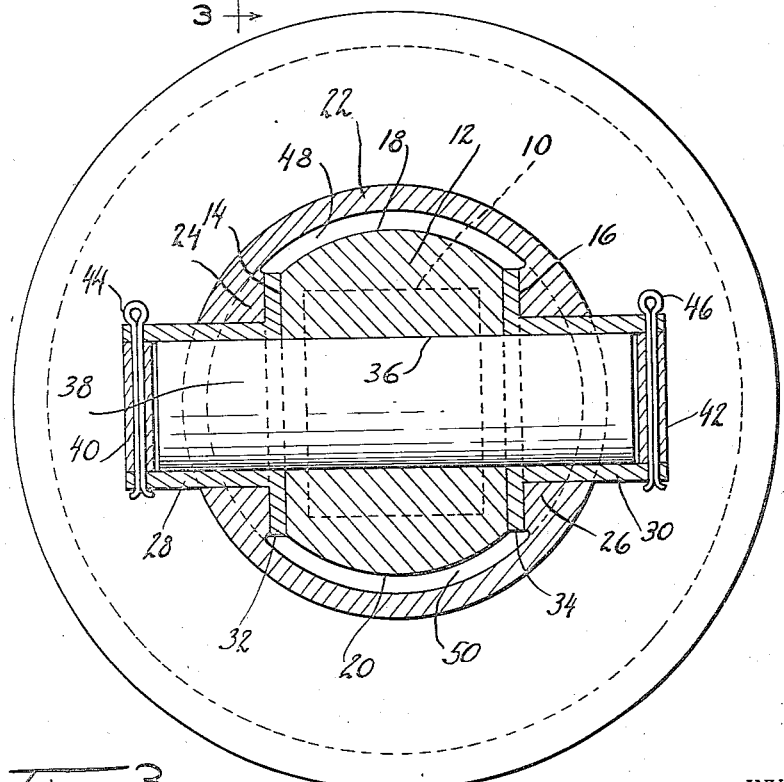

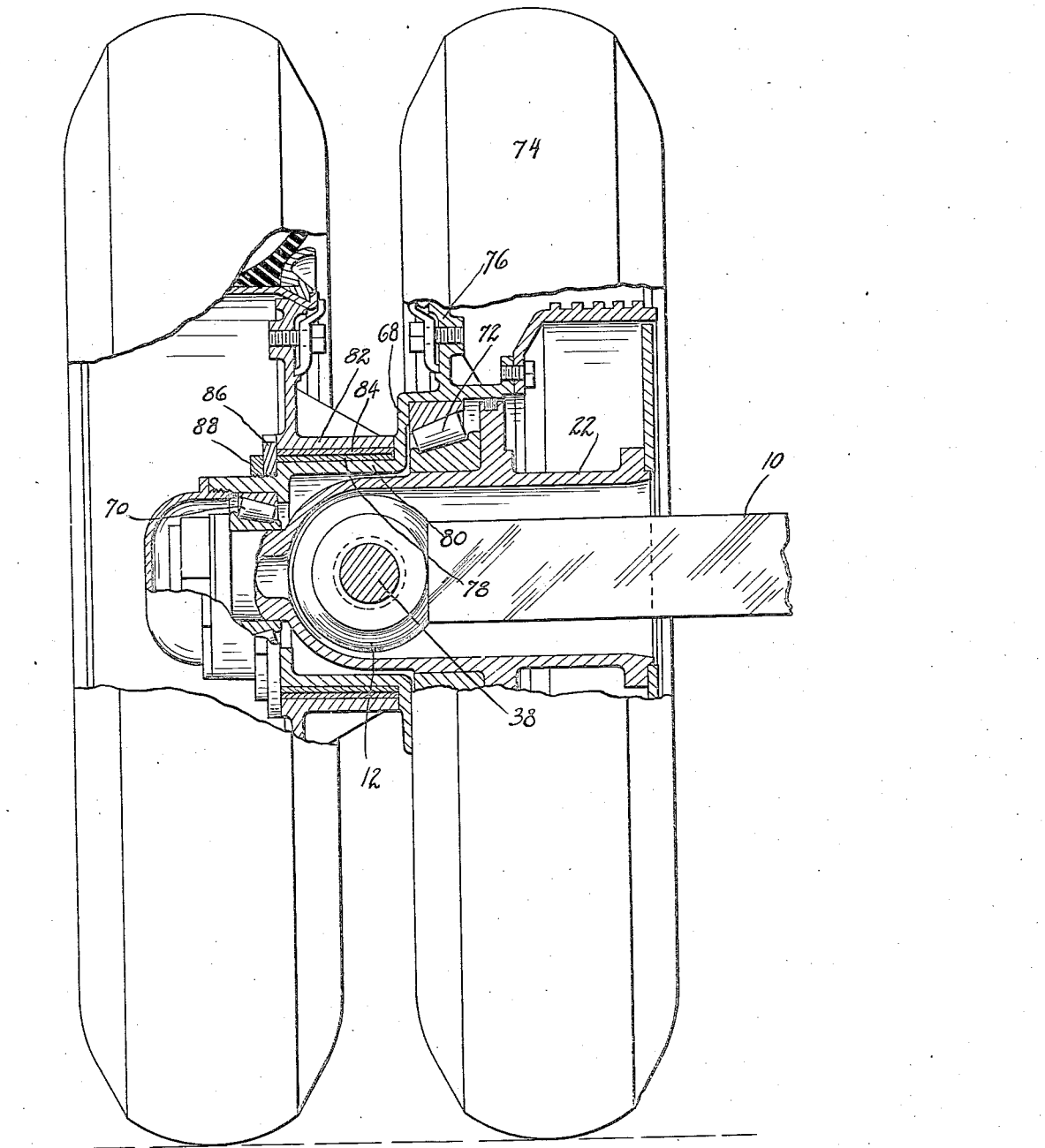
Fig. A

Patented Oct. 9, 1934

1,976,068

UNITED STATES PATENT OFFICE 1,976,068

FLOATING WHEEL HUB MOUNTING

James F. Higbee, Detroit, Mich., assignor, by mesne assignments, of one-half to Edith B. Panabaker, Harrow, Ontario, Canada, as trustee Application November 5, 1930, Serial No. 493,585

9 Claims. (Cl. 301—1)

My invention relates to vehicle supporting wheels and has particular reference to a wheel hub assembly supported for limited floating movement with respect to the supporting axle.

Due to the fact that all modern roads are constructed in such a way as to provide a crown at the center and sides which slope downwardly therefrom toward either extremity, there is a decided tendency to cause unnecessary wear on the treads of vehicle supporting tires. Not only is this true of the conventional single wheel structure but it is particularly true where dual wheels are utilized. Where a single wheel, only, engages the sloping side of the road there is a tendency to create more rapid wear on the inner side of the tire tread than at any other portion. This will be obvious in view of the fact that the wheel supporting the tire is secured in a vertical position, and can not accommodate itself to occupy a position normal to the surface of the crown of the road on which it stands.

Where, however, dual wheels are utilized for supporting a load, as is frequently the case with trucks, busses, trailers, semi-trailer and other vehicles, there is a substantial variation in wear of the tires on the two wheels which make up the dual wheel unit. This is attributable to the fact that the two wheels are mounted in such a way that they are forced to remain in a vertical plane while the surface which is supporting the load through the said wheels and tires is sloping at a decided angle to the horizontal. Under such circumstances the inner tire, which normally rests upon the portion of the road nearest the crown thereof, is forced to sustain a greater portion of the load than the outer wheel. This is true when it is assumed that both tires are equally inflated. The result is that there will be greater wear on the inner tire tread than on the outer, necessitating frequent shifting of the inner and outer tires to insure maximum life of the treads.

In some cases the crown of the road is at such an angle that the inner tire of the dual wheel assembly is forced to support the entire weight which is intended to be carried by both tires. As pneumatic tires are built for definite overload limitations such a weight so overloads the tire as to produce rapid deterioration. As a rule, however, each tire bears a part of the load but the greater part is borne by the inner tire and as a result the inner tire wears out more rapidly than the outer tire.

Furthermore, due to the inner tire bearing the larger portion of the load it is compressed and flattened out to an extent substantially greater than the outer tire. The weight on the outer tire is frequently such that it is flattened out scarcely at all. Because of this dissimilarity of compression and flattening of the two tires one or both of the tires is caused to drag over the road surface which not only increases the resistance and power load but also aggravates excessive tire wear.

Frequently the inner tire of such a dual wheel assembly is deflated to a pressure somewhat lower than the outer tire for the very purpose of permitting each tire of the dual wheel assembly to support a substantially equal load. When such methods are resorted to the trouble, contrary to being eliminated, is simply shifted to another cause, which cause itself can likewise be traced to the fact that the wheels are secured in a vertical plane. Under such circumstances the inner tire will still wear more rapidly than the outer by reason of the fact that it is deflated.

Hitherto such difficulties have been recognized and attempts have been made to eliminate the trouble. In some instances the supporting axle has been bent at its center at an angle conforming substantially to the angle of the crown of an average road. Such structure obviously falls short of constituting a satisfactory remedy because the fixed plane in which the wheels are supported at the extremities of such an axle will always be the same, whereas crowns on various roads vary considerably. Furthermore, an axle formed in this manner causes difficulty in securing the vehicle supporting springs in an absolute vertical plane. Axles have been pivoted at their center to permit the two ends to flex with relation to one another within given limits, but here again the obvious difficulty involved in properly securing the vehicle supporting springs to the axle arises.

The object of my invention is to eliminate the basic cause for such uneven wear on the tire treads by so mounting the wheel assembly upon its supporting axle as to permit limited swinging movement of the assembly in a vertical plane transverse to the plane of the assembly. In this way the wheels of both single and dual assemblies may at all times lie in a plane vertical to the sloping surface of the side of the road.

A further object of my invention is to provide means whereby supporting wheels may be mounted as above specified upon a rigid axle without the necessity of bending said axle at any point. In this way the vehicle supporting spring structure, et cetera, may be assembled in the normal way and lie in an absolute vertical plane.

More specifically, the object of my invention is to rotatably mount a hub, which hub may be designed to support either single or dual wheel assemblies, upon the extremity of an axle in such a way that it is prevented from movement with relation to said axle in any direction except such as will enable it to lie in a plane vertical to the plane of any supporting surface over which it is apt to travel under normal conditions.

Various other objects and meritorious features of my invention will appear from the following description taken in conjunction with the drawings, wherein like figures refer to like drawings throughout the several figures, and wherein:

Fig. 2 is a sectional plan view through the center of the axle, and

Fig. 3 is a vertical section through the same point.

Fig. 4 is a modified structure.

Figure 1:
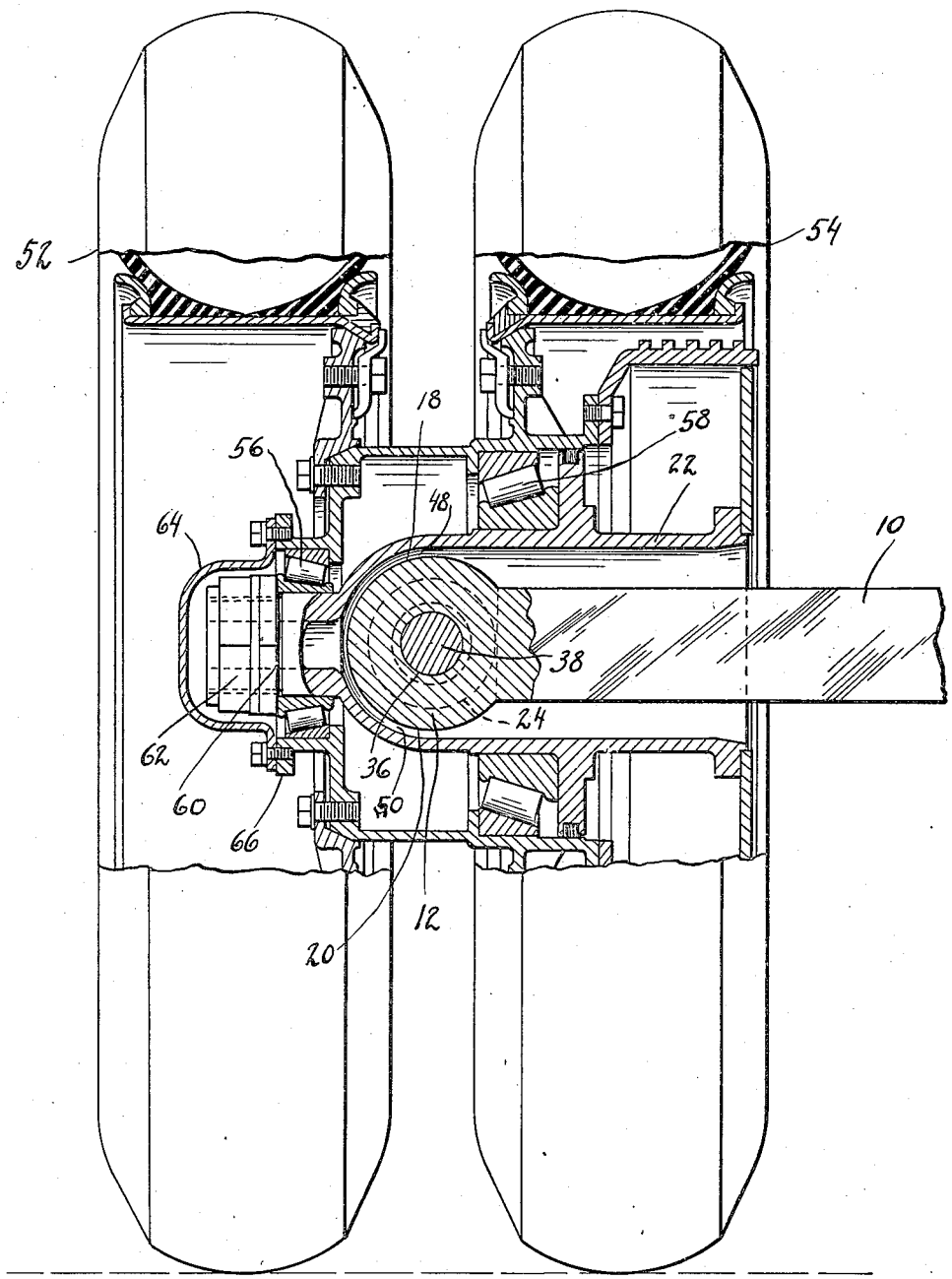
Fig. 1 is a sectional elevation of my improved structure.

While I have illustrated in the drawings a dual wheel assembly, I wish it to be understood that an assembly may be designed without departing from the invention defined and claimed herein embodying a single wheel. For purposes of illustration I have shown a square axle 10, but it is not necessary that the axle be square. The axle terminates with an enlarged end portion indicated by the numeral 12 which includes the two flat vertical side walls 14 and 16 and the upper and lower spherical surfaces 18 and 20 respectively.

The skein 22 is of sufficient diameter to provide a substantial clearance for the axle 10. This skein or spindle head member is open at one end and its outer end is so formed that the solid spherical segments 24 and 26 provide flat surfaces in parallel relation to the side faces 14 and 16 of the axle end 12. The portions 24 and 26 are bored out to permit the insertion of bosses 28 and 30, each of which bosses is provided with a circular flange 32 and 34, between the inner faces of which flanges the flat sides 14 and 16 of the axle end 12 are adapted to seat snugly.

In assembling the structure the flanged bosses are first inserted in the outer end of the skein and the skein is then subsequently slipped over the axle end. The axle end is bored out, as at 36 to aline with the bosses 28 and 30 and a positioning pin 38 is inserted to retain the skein and axle assembly in place. The outer end of each of the bosses 28 and 30 is closed, as by means of plugs 40 and 42, which are held in position by means of elongated cotter pins 44 and 46. In this way the pin 38 is positively prevented from slipping out of place.

The diameter of the skein 22, as heretofore stated, is sufficiently large to provide ample clearance between the wall of said skein and the axle 10. The curvature of the spherical surfaces 18 and 20 of the axle end portion 12 conforms substantially to the curvature of the closed end portion of the skein member 22, but a substantial clearance is maintained as indicated at 48 and 50. It will therefore be seen that the skein member 22 is free to swing about the end portion 12 of the axle in a vertical plane upon a horizontal axis through the said axle whereby the wheels rotatably supported thereupon may conform to the angle of any given road crown to stand normal with respect thereto.

For purposes of illustration I have shown in Fig. 1 a more or less conventional dual wheel assembly, the wheels 52 and 54 being carried upon a hub 53 which is in turn journalled upon the bearing assemblies 56 and 58 respectively, which bearing assemblies may be secured in position as illustrated. The skein 22 is threaded at its outer extremity as at 60 to receive the threaded lock nut 62 which, in the structure illustrated, retains the bearing assembly 56 in position. The hub cap 64 is bolted to flange portion 66 of the hub 53.

In Fig. 4 I have illustrated a somewhat modified form of structure. It will be obvious that on turning movement of the vehicle supported by the dual wheels where will be a tendency for the two wheels to rotate at different speeds due to the variation in curvature radius. For that reason I propose to mount each of my wheels for independent rotation about the rockable hub. In this way all drag against the road surface of either tire due to the differential rotary speed on turning movement will be eliminated.

The skein 22 in Fig. 4 is mounted for rocking movement about the supporting extremity of axle 10 in precisely the same manner as disclosed in Figs. 1, 2, and 3. A hub 68 is journalled upon bearing assemblies 70 and 72 and the inner wheel assembly 74 is secured to a radial flange 76 of the hub 68.

A hardened steel sleeve 78 is shrunk over the portion 80 of hub 68 and the outer wheel assembly is supported by a flanged hub 82 in which is seated a hardened steel bearing ring 84. The bearing ring 84 is adapted to telescope over the sleeve 78 and a retaining nut 86 is threaded on to the extremity of hub 68 to retain the same in place. Lock nut 88 secures securing nut 86 in position.

In this way each of the wheels of this dual assembly is permitted to rotate independently. Inasmuch as the difference in the speeds of rotation will be slight and non-continuous, there is no necessity for providing roller bearings for each of the wheels, the hardened steel sleeves being quite adequate for this purose.

Having illustrated a preferred form of my improved structure, various modifications will be apparent to those skilled in the art and for that reason I intend to limit myself only within the scope of the appended claims.

What I claim:

1. In combination with an axle skein having a dual wheel assembly mounted thereon, an axle having an enlarged end portion, said end portion including flat vertical side faces and spherical upper and lower surfaces respectively.

2. In combination with structure of the class described, an axle skein comprising a sleeve like structure open at one end and at the other end provided with inner flat side walls lying in a vertical plane and substantially spherical upper and lower surfaces between said side walls, and a dual wheel assembly mounted on said skein.

3. A structure of the class described comprising, in combination, an axle having an enlarged end portion including flat vertical side walls and spherical upper and lower surfaces, a skein mounted upon said enlarged portion for movement relative thereto about a horizontal axis transverse to said axle and having inner side walls adapted to cooperate with the side walls of said axle end portion and substantially spherical upper and lower surfaces adapted to provide clearance between the upper and lower surfaces of said axle end sections, and a dual wheel assembly mounted on said skein.

4. A dual wheel assembly comprising an axle, a skein mounted thereon for lateral swinging movement about a horizontal axis, and road engaging wheels rotatably supported by said skein upon opposite sides of said horizontal axis.

5. A dual wheel assembly comprising an axle, a skein mounted thereon for lateral swinging movement about a horizontal axis, and road engaging wheels independently rotatably supported upon said skein upon opposite sides of its horizontal axis.

6. A vehicle supporting dual wheel assembly comprising an axle, a skein mounted thereon to permit limited swinging movement about a horizontal axis, said skein including a portion surrounding said axle on one side of the extremity thereof and a projecting stub portion in axial alinement with said axle beyond the extremity of said axle, and a pair of wheels rotatably mounted upon said skein and supported by the axle surrounding portion and the projecting stub portion thereof respectively.

7. In a structure of the class described, an axle, an axle skein, a road wheel assembly journalled upon said skein, means pivotally mounting the skein upon the axle to swing about a horizontal axis positioned within the plane of the road wheel assembly to permit said assembly to occupy at all times a plane normal to the surface of the road over which the wheel assembly travels.

8. In a wheel and axle assembly of the class described, an axle, an axle skein, a road wheel assembly journalled upon said skein, means pivotally connecting the skein to the end of the axle outwardly beyond a line normal to the surface of the road at the innermost point of contact of the wheel assembly with the surface of the road to swing about a horizontal axis to occupy a position normal to a road surface with respect to which the axle may not be in parallelism.

9. A vehicle supporting dual wheel assembly comprising an axle, a skein mounted on the end of the axle for swinging movement about a horizontal axis, said skein having a pair of bearings arranged on opposite sides of its horizontal axis, a road engaging wheel having a hub journalled upon said bearings with the plane of the wheel being disposed on one side of the horizontal axis of the skein, a second road engaging wheel journalled upon the hub of the first wheel for rotation independently thereof with the plane of the wheel being disposed on the opposite side of the horizontal axis from the first wheel.

JAMES F. HIGBEE.